US012049790B2

(12) United States Patent
Ott et al.

(10) Patent No.: US 12,049,790 B2
(45) Date of Patent: Jul. 30, 2024

(54) SELF-LOCKING THREADED CONNECTION PARTIALLY IN NON-LOCKING ENGAGEMENT

(71) Applicants: VALLOUREC OIL AND GAS FRANCE, Aulnoye-Aymeries (FR); NIPPON STEEL CORPORATION, Chiyoda-ku (JP)

(72) Inventors: Wesley Ott, Boulogne-Billancourt (FR); Scott Granger, Boulogne-Billancourt (FR)

(73) Assignees: VALLOUREC OIL AND GAS FRANCE, Aulnoye-Aymeries (FR); NIPPON STEEL CORPORATION, Chiyoda-ku (JP)

( * ) Notice: Subject to any disclaimer, the term of this patent is extended or adjusted under 35 U.S.C. 154(b) by 124 days.

(21) Appl. No.: 17/759,408

(22) PCT Filed: Jan. 25, 2021

(86) PCT No.: PCT/EP2021/051552
§ 371 (c)(1),
(2) Date: Jul. 25, 2022

(87) PCT Pub. No.: WO2021/151810
PCT Pub. Date: Aug. 5, 2021

(65) Prior Publication Data
US 2023/0066104 A1     Mar. 2, 2023

(30) Foreign Application Priority Data

Jan. 27, 2020   (EP) ..................................... 20153787

(51) Int. Cl.
*E21B 17/043*     (2006.01)
*E21B 17/042*     (2006.01)
(Continued)

(52) U.S. Cl.
CPC .......... *E21B 17/043* (2013.01); *E21B 17/042* (2013.01); *F16L 15/001* (2013.01); *F16L 15/06* (2013.01)

(58) Field of Classification Search
CPC ....... F16L 15/001; F16L 15/06; E21B 17/042; E21B 17/043
See application file for complete search history.

(56) References Cited

U.S. PATENT DOCUMENTS 5,415,442 A * 5/1995 Klementich
8,925,975 B2 * 1/2015 Granger ................ E21B 17/042
(Continued)

FOREIGN PATENT DOCUMENTS

| EP | 3 078 893 A1 | 10/2016 |
| EP | 3 514 431 A1 | 7/2019 |
| WO | WO 2016/108141 A1 | 7/2016 |

OTHER PUBLICATIONS

International Search Report mailed on Mar. 30, 2021 in PCT/EP2021/051552 filed on Jan. 25, 2021, 3 pages.

*Primary Examiner* — William S. Choi
(74) *Attorney, Agent, or Firm* — Oblon, McClelland, Maier & Neustadt, L.L.P.

(57) ABSTRACT

A self-locking threaded connection partially in a non-locking engagement includes a first and a second tubular component provided respectively with male and female threaded zone at their respective ends. First portions of the female threaded zones with varying thread width and root cooperate together along a self-locking tightening arrangement. A locking region within the threaded connection is located in the middle of non-locking, and radially centered to the pipe body API tolerances in order to withstand high torque and seal performances.

18 Claims, 4 Drawing Sheets

(51) Int. Cl.
  *F16L 15/00*   (2006.01)
  *F16L 15/06*   (2006.01)

(56) References Cited

U.S. PATENT DOCUMENTS

2012/0074690 A1* 3/2012 Mallis .................... F16L 15/06
2014/0203556 A1* 7/2014 Besse .................... E21B 17/042
2018/0340378 A1* 11/2018 Enderle ................ F16L 15/001
2019/0211952 A1* 7/2019 DeHart ................ F16L 15/001

* cited by examiner

SELF-LOCKING THREADED CONNECTION PARTIALLY IN NON-LOCKING ENGAGEMENT

The present invention relates to a self-locking threaded connection partially in a non locking engagement. The aim of the invention is to optimize reliability and cost efficiency for customers running shale gas operations, and especially to increase well integrity of such shale gas wells. The connection according to the invention is able to withstand high torques required for special applications such as drilling with casing, even in wells with complex configurations, such as directional and horizontal wells. Therefore the invention proposes a threaded joint for casings and tubings able to withstand severe test program of combined loads such as tension and compression, internal and external pressure, and bending, as those mentioned in 2016 draft API Technical Report (TR) 5SF, Guidelines for Evaluation Casing Connection Performance in Multi-Fractured Horizontal Wells. Installation loading will include fatiguing the connection, stimulation loading will simulate hydraulic fracture, and production loading will test the connection around the Von Mises Equivalent with bending and at elevated temperature.

The present invention design is particularly suited for intermediate casing, and especially for casing used for fracking.

A threaded connection usually comprises a first and a second tubular component, one being provided with a male member at one end of a first pipe body, and the other being provided with a female member at another end of a second pipe body, each member being provided with a threaded zone.

In known fashion, it is conventional to connect male and female members by make-up of the male threaded zone with the female threaded zone, the assembly defining a connection.

Meanwhile, in a case of the integral connection type, both first and second pipe body are steel pipes, and a coupling is not used. In this case, steel pipes adjacent to each other are directly connected to each other without using coupling. Adjacent steel pipes being of the same nominal outer diameter and of the same wall thickness, end forming of both pipe ends are needed to provide them with those threaded zones. Preferably, the male member is swaged and the female member is expanded prior to the machining of the thread.

Increase of the outer diameter and corresponding reduction of the inner diameter at the location of the threaded connection are determined by API standards, in order to maintain drift tolerances as specified, and to remain in acceptable outer diameter tolerance to avoid perturbation of the well integrity to be equipped with such casing.

Thus usually for semi flush threaded connection, roughly for major conventional dimensions, nominal outer diameter of the threaded connection shall remain below 106% of the pipe body nominal outer diameter, and inner diameter of the threaded connection suitable to comply with API drift requirement as set in API RP 5C5.

A string of tubular components thus constituted may also be rotated when drilling with casing of the well. For this reason, the components must be made up together with a high torque in order to be able to transmit a rotational torque which is sufficient to allow the string to be advanced into the well and also not to break it out. When rotational movement is provided to the string to progress in the pipe, the rotational movement is progressively transmitted from pipe bodies with the largest diameter to the smaller ones of the string which are at the deepest location.

For conventional products, the make-up torque is generally reached thanks to cooperation by tightening of abutment surfaces provided at a free end of a pipe body to abut in a made up position with a corresponding shoulder surface. However, because the extent of abutment surfaces is a fraction of the thickness of the tubes, the critical plastication threshold of the abutment surfaces is rapidly reached when too great a make-up torque is applied, especially when it concerns pipe bodies with small diameter.

A major issue of those connection is also to provide enough seal performances when they are placed at their proper location in the well. Production process will expose connection to fluid with strong variation of internal pressure within the casing. Thus integral connection are to optimize both torque capacity and seal performance at the same time, while dealing with liquid sealability need.

Document U.S. Pat. No. 7,661,728 teach an integral treaded connection with enough torque capacity wherein the connection is not having any abutment surfaces, but rely on two threaded zones with low taper thread and both threaded zones being in a self locking arrangement. Both threaded zones comprise threads of the male end (also termed PIN member) and threads of the female end (also termed BOX member) having a constant lead but variable thread widths, because a stab lead of the stab flanks is not equal to a load lead of the load flanks. That type of thread is said wedge threads. According to that document, seal performance is provided with a metal-to-metal seal in order to reach premium seal performance for both liquid and gas. Male and female members each respectively comprise a sealing surface which can cooperate with each other in tightening contact (also termed contact with interference) when the threaded zones cooperate following self-locking make-up.

Conventionally, the thread of the male end has a pin thread crest, a pin thread root, a pin load flank, and a pin stab flank. The thread of the female end has a box thread crest, a box thread root, a box load flank, and a box stab flank. More precisely with wedge thread, the widths of the crests of the threads (or teeth) increase progressively for the threads of the male end or female end respectively with increasing distance from the male axial end or female axial end respectively.

Wedge threads are characterized by a wedge ratio, which is a non-zero difference between Load Flank lead LFL and Stab Flank lead SFL, Load Flank lead LFL being either strictly greater or strictly smaller than Stab Flank lead SFL, difference being calculated with the respective lead values. In conventional wedge thread, LFL of both pin member and box member are equal, and respectively, SFL of both pin member and box member are also equal. Thus, wedge ratio are the same for both the pin member and the box member. During make-up, the male and female threads (or teeth) finish by locking into each other in a predictable position corresponding to a locking point.

More precisely, locking occurs for self-locking threading when both the stab flanks and the load flanks of the male threads (or teeth) lock against respectively the stab flanks and the load flanks of the corresponding female threads (or teeth). For this reason, the make-up torque is taken by all of the contact surfaces between those flanks, i.e. a total surface area which is very substantially greater than that constituted by abutment surfaces of the prior art.

But when that type of connection is downsized to fit into pipe with small outer diameter and low wall thickness, then the behavior of downsized threaded zones does not behave as forecast, as the teeth height of a thread is an important parameter to calculate torque capacity. Thus, the connection design of that type of teaching need to be fully reviewed as it doesn't provide the requested torque capacity and seal performances when purely downsized. Another way to reduce the dimension of a known connection is to reduce the number of turns of the threaded zone, but then the torque capacity significantly reduce accordingly.

Another threaded connection of the art dedicated for semi premium connection with only liquid seal performances is known from WO-2019-076622. That document teach a connection having a threaded zone made of teeth having twice an evolution in the lead profile of both pin and box member such that both pin and box thread profile comprise regular teeth at both extremities of their respective threaded zone, regular teeth being adjacent teeth having the same crest width and the same root width. In between those regular teeth, both pin and box threaded zones comprise wedge threads. Wedge thread of pin and box are only partially in a self-locking engagement as those wedge threads are not exactly located at the same position along the tapered threaded zone.

But that connection design according to WO-2019-076622 did not succeed to pass combined load testing with higher yield strength material above 140 ksi, and didn't pass bending testing with yield strength material of 125 ksi and above when tested into connection of outer diameter of 346 mm (13⅝") and weight 88.2 which correspond to respectively to a nominal inner diameter of 314.33 mm (12.38"). That connection having such complex evolution in lead profiles of both pin and box member, that all pipe body outer diameter sizes are to be designed with the same connection profile, but then the connection only reaches a connection efficiency of 73% of the pipe body efficiency when tested in size such as an 346 mm (13⅝") outer diameter. Moreover that connection design seemed to be not suited for pipes with an outer diameter of 346 mm (13⅝") or below and yield strength material of 125 ksi or above. Moreover it would not be possible to downsize every part of the connection, as smaller threads would significantly reduce thread torque capacity.

There is a need for a cost effective connection providing wider tolerance for machining while reaching API 5C5:2017 CAL-I liquid seal guarantees under bending and elevated temperature bending, even for pipe nominal diameter below 346 mm (13⅝") less prone to damage during handling and running, with a longer lifetime due to higher acceptable number of make & brake cycles. There is also a need for a connection with higher torque, faster make-up, and more economical to manufacture especially for small pipe body outer diameter sizes between 76.2 mm (3 inches) and 152.4 mm (6 inches). Those needs combine with a need for a connection efficiency above 85% of the pipe body efficiency.

For this reason, and especially for pipe body of outer diameter below 346 mm (13⅝ inch), there is a very specific need for solution able to withstand such torque requirement, in addition to shale specifics requirements, such as cyclical fatigue due to rotation of the string during installation of a casing in lateral section of wells and later exposure to high internal pressure, bending and high temperature from hydraulic fracturing process. Severe test program including water sealability testing, also made under bending conditions were performed.

For this reason, the aim of the invention is to provide a semi-premium, semi-flush connection dedicated to shale applications having self locking thread, such that the locking thread provide a seal sufficient to withstand seal to liquid, but also sufficient to provide enough torque capacity. In addition to the above requirement to be solved, there is a need such a connection be with reasonable manufacturing costs, in terms of number of paths with the machining insert tool on both pin and box members.

More precisely, the invention provides a threaded connection comprising a first and a second tubular component, the first tubular component being provided with a pipe body and a male member at a distal end of the pipe body, the second tubular component being provided with another pipe body and a female member at a distal end of that pipe body, such that a male member comprises, on its external peripheral surface, at least one male threaded zone and finishes in a male terminal surface, and a female member comprises, on its internal peripheral surface, at least one female threaded zone and finishes in a female terminal surface, the male threaded zone comprising a male thread having a first portion in which the width of the thread root (WRp) decreases in a direction oriented from the male terminal surface towards the pipe body of the first tubular component, and a second portion adjacent to the first portion in which the width of the thread root remains at a minimum constant width value (WRpmin), the tooth closest to the male terminal surface presenting a maximum root width value (WRpmax) of the male thread, and the female threaded zone comprising a female thread having a first portion in which the width of the thread root (WRb) decreases along a direction oriented from the female terminal surface towards the pipe body of the second tubular component, and a second portion adjacent to the first portion in which the width of the thread root remains at a minimum constant width value (WRbmin), the tooth closest to the female terminal surface (8) presenting a maximum root width value (WRbmax) of the female thread, wherein the first portions of the male thread and female thread are partially made up in a self-locking arrangement in order to provide a locking region in the threaded connection.

A technical advantage of a connection according to the invention is that no specific make up torque chart is required to follow during assembly, as torque chart for a connection according to the invention allows for a basic make up signature and wider tolerances than average torque window for prior art connection. This advantage is significant in order to lower cost for running that type of connection.

Another advantage of the present invention is that the make up torque is achievable with rig's torque capacity, and that the connection may be made up in less than 1.5 turn after hand tight when both stab and load flanks are contacting each other, more likely connection according to the invention requires less than 4 turns from stabbing to final make-up position.

Another advantage of the present invention is that the connection also fulfilled API RP 5C5:2017 CAL-I series B without bending, but also with bending, and also elevated temperature with bending testing protocols to guaranty liquid seal also under bending. Liquid sealbility was also demonstrated after more than 40,000 fatigue exposure of the connection. Optional complementary or substitutional characteristics of the invention are given below.

Locking region may preferably represents more than 60% of the total make up length of engaged male and female threads.

Especially, the locking region may be located between two non locking regions, each non locking region being respectively adjacent to each longitudinal sides of the locking region.

According to a first embodiment of the invention, the male threaded zone may comprise a single male thread made of a single continuous spiral such that the lead of the male stab flanks (SFL_p) changes at a single location (24) on the male thread, and the female threaded zone comprise a single female thread made of a single continuous spiral such that the lead of the female stab flanks (SFL_b) changes at a single location (25) on the female thread, respective male and female change in stab flanks leads being at different location such that a locking region is defined between those two locations, and wherein the lead of male load flanks (LFL_p) and the lead of the female load flanks (LFL_b) remain constant along the whole male threaded zone, and respectively female threaded zone.

According to a another embodiment of the invention, the male threaded zone comprise a single male thread made of a single continuous spiral such that the lead of the male load flanks (LFL_p) changes at a single location on the male thread, and the female threaded zone comprise a single female thread made of a single continuous spiral such that the lead of the female load flanks (LFL_b) changes at a single location on the female thread, respective male and female change in load flanks leads being at different location such that a locking region is defined between those two locations, and wherein the lead of male stab flanks (SFL_p) and the lead of the female stab flanks (SFL_b) remain constant along the whole male threaded zone, and respectively female threaded zone.

For example, a wedge ratio in the locking region may be set below 0.15 mm.

Preferably, the male and female threaded zones may have a taper generatrix forming an angle θ is the taper angle, wherein the taper angle is an angle between a generatrix of male and female threaded zones and the axis of the connection with the axis of the connection, the taper being in the range of ⅙ to ⅛, and preferably selected in the range of ⅙ to ⅒ and even more preferably around 12.5%, and wherein crests and roots of the male and female thread in the locking region are parallel to the taper generatrix of the threaded zones.

A middle locking location (M) is identified at axial half length of the locking region such that a pitch line diameter at the middle locking location TDavg may be defined as follows $$(OD+ID\max) \div 2 - 5\% \, WT < TD\text{avg} < (OD+ID\max) \div 2 + 10\% \, WT$$

wherein
OD is a nominal pipe body outer diameter according to API 5CT requirement
WT is a nominal pipe width according to API 5CT requirement
IDmax is a maximum accepted pipe body inner diameter according to API 5CT requirement (API 5CT provides nominal OD and WT sizes for pipes, and provides also with tolerances for both dimensions. So IDmax is calculated with maximum accepted pipe body outer diameter and minimum accepted pipe width).

The above proposed definition of the pitch line diameter at the middle locking location TDavg is useful to adapt connection definition according to the invention to all type of pipe body sizes.

That middle locking location (M) is identified at axial half length of the locking region such that a length Lnl from that middle locking location to a longitudinal side of the locking region may be defined as follows $$Lnl \leq (OD \div 2 - ID\max \div 2 - TH\text{pitch}) \div (2*\tan(\theta))$$

wherein
OD is a nominal pipe body outer diameter according to API 5CT requirement
IDmax is a maximum accepted pipe body inner diameter according to API 5CT requirement
THpitch is a vertical distance from pitch line to root or crest in the locking region
θ is the taper angle of the threaded zone.

The above proposed definition of the length Lnl from that middle locking location to a longitudinal side of the locking region is useful to adapt connection definition according to the invention to all type of pipe body sizes taking into account thread height.

Preferably maximum root width value of the male and or female thread may be set below twice the minimum root width value of the corresponding male or female thread. This allows for cheaper machining costs.

The root of the female thread which is closest to the pipe body of the second tubular component may have the same root width as the root of the male thread which is closest to the pipe body of the first tubular component.

Respective teeth of the male thread and female thread respectively close to the pipe body may have imperfect thread height and or vanishing thread teeth.

The female thread may start as of the female terminal surface as well as the male thread may start as of the male terminal surface.

Preferably to avoid jump out, teeth of the male and female threaded zones may have a dovetail profile, and, α and β are the load and respectively stab flank angle with a perpendicular to the axis of the connection, both α and β being less than 5°.

Both the crests of the teeth of the male thread and the crests of the teeth of the female thread may be interfering with corresponding roots in the locking region, such that the diameter interference at the root/crest interference may be between 0.0020 and 0.0030 times the pipe body nominal outer diameter.

A connection according to the invention may be free from any distal abutment surface, a free end of the male member being away from the female member, and respectively a free end of the female member being away from the male member.

Both male and female member may be free of any additional sealing surfaces beside the locking region.

The threaded connection may be semi flush, and the first and a second tubular component are integral, each first and second tubular component comprising a male member and a female member.

The male threaded zone and the female threaded zone may be single start thread.

The characteristics and advantages of the invention are disclosed in more detail in the following description made with reference to the accompanying drawings.

FIG. 1 is a longitudinal cross-sectional view of one half of a connection comprising a self-locking threading in accordance with the invention, in a made up state;

FIG. 2 is a graph according to a first embodiment of the invention, showing the evolution of the leads of the load flanks and the stab flanks for respectively the male member and female member along the threads of the male and female member in accordance with FIG. 1 in between distal end surfaces of the male member and respectively the female member, when the connection is made up. Lead values of respectively male stabbing flanks (SFL_p), male loading flanks (LFL_p), female stabbing flanks (SFL_b), and female loading flanks (LFL_b) along y-axis, with x-axis representing the location of the thread along a longitudinal axis of the tubular component;

Figure 1:
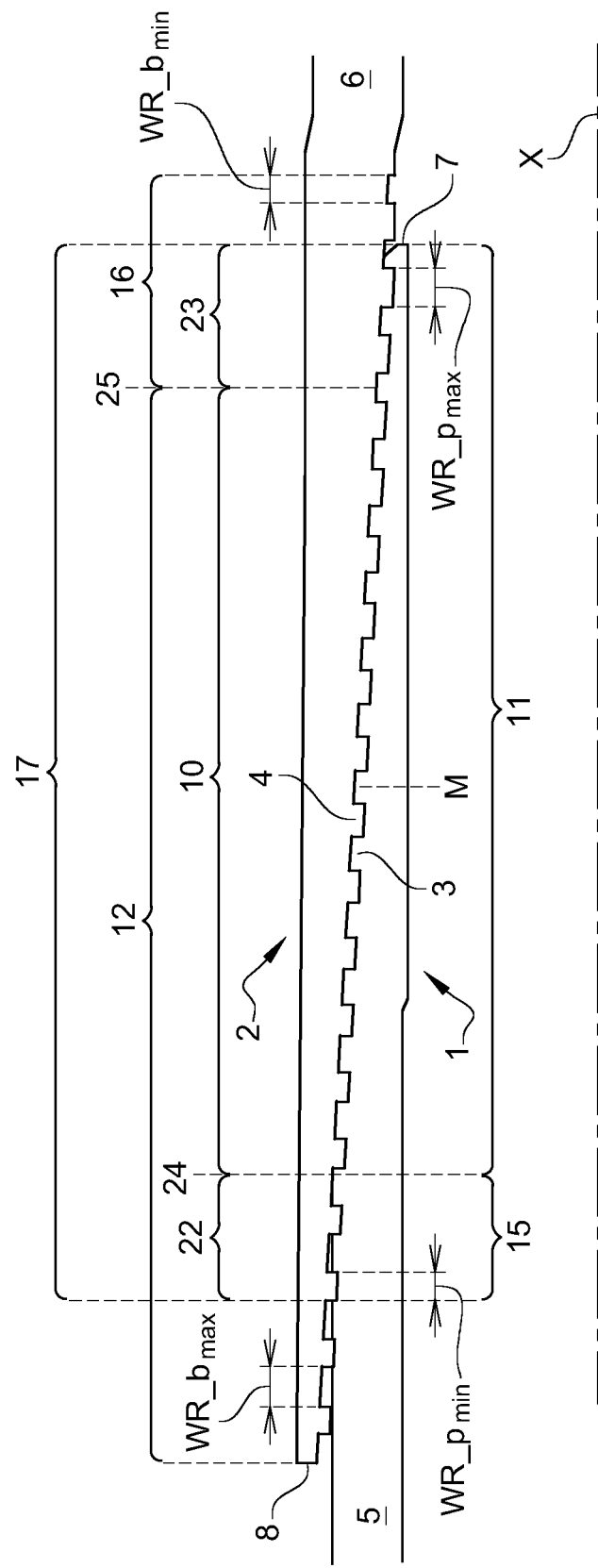

The threaded tubular connection shown in FIG. 1 comprises a tubular component 5 provided with a male member 1 and a second tubular component 6 provided with a female member 2. Male member 1 extends from a pipe body of the first tubular component 5. Female member 2 extends from a pipe body of the second tubular component 6.

Preferably, both tubular components 5 and 6 are integral, as they are both provided with a pipe body, a male member at one first distal end of the pipe body, and at an opposite distal end of that pipe body with a female member. Both tubular components are made out of steel, and, in one example carbon martensitic steel, with yield strength able to range from 80 ksi (550 MPa) to 140 ksi (965 MPa).

For example, grade of the material is between 80 ksi (550 MPa) and 140 ksi (965 MPa). For example, grade is above 100 ksi (690 MPa), for example equal to 125 ksi (860 MPa).

Pipe body may be with a nominal outer diameter between 3½" (88.90 mm) to 13⅝" (346 mm), and pipe body wall width of 8 to 22 mm, but preferably with nominal outer diameter below 10" (254 mm), and even more preferably below 6" (152.4 mm).

According to API 5CT 10th edition 2018, there are list of regular pipe body nominal outer diameters, and for each size a corresponding Connection acceptable outer diameter, as mentioned below

| pipe body nominal outer diameter | Coupling connection outer diameter |
|---|---|
| 88.9 mm (3.5 inch) | 107.95 mm (4.25 inch) |
| 101.6 mm (4 inch) | 120.65 mm (4.75 inch) |
| 114.3 mm (4.5 inch) | 132.08 mm (5.2 inch) |
| 127 mm (5 inch) | 147.32 mm (5.8 inch) |
| 139.7 mm (5.5 inch). | 160.02 mm (6.3 inch) |

The outer diameter of the connection according to the invention is selected to be the same as the Coupling connection outer diameter of the next size down API 5CT.

According to one embodiment of the invention, the pipe body outer diameter may be 5.5" (139.7 mm), with a pipe body mass of 20 lb/ft corresponding to a pipe body wall width of 0.361" (9.17 mm). For that example, coupling connection outer diameter is then of 147.32 mm (5.8 inch) The connection inner diameter is dependent on the API 5CT drift with clearance requirement so that even if made up to maximum make up torque according to the make up tolerance, it still drifts.

The male member finishes in a male terminal surface 7, forming an axial free end of the male member or pin face. The male terminal surface 7 is also a free axial surface of the first tubular component. The female member 2 finishes in a female terminal surface 8, forming an axial free end of the female member or box face. The female terminal surface 8 is also a free axial surface of the second tubular component. The male terminal surface 7 and the female terminal surface 8 are oriented radially with respect to the longitudinal axis X of the connection. None of the male terminal surface 7 and the female terminal surface 8 are placed in abutment contact at the end of make up.

Both male member 1 and female member 2 are provided with tapered threaded zones 3, 4 that cooperate for mutual connection by make-up of the two components. Threaded zones are respectively machined. FIG. 1, the threaded connection is shown fully made up.

According to the present invention, connection efficiency is above 80% of the pipe body yield strength.

A taper angle θ of the tapered threaded zones 3, 4 is an angle between a generatrix of male and female tapered threaded zones and a longitudinal axis X of the connection, the taper being in the range of ⅙ to ¹⁄₁₈, and preferably selected in the range of ⅙ to ¹⁄₁₀ and even more preferably around 12.5%. Preferably, a taper value may be ⅛ or ⅙, corresponding respectively to taper angle θ of 3.6° and 4.8°.

Male and female threaded zones 3 and 4 are single start according to a first embodiment of the invention. Single start means that each threaded zone 3 and respectively 4 has a unique and single threaded spire with no interruption, spire being a continuous helix.

According to FIG. 1, threaded zone 3 and respectively 4 starts as of the male terminal surface 7, respectively the female terminal surface 8.

Figure 5:
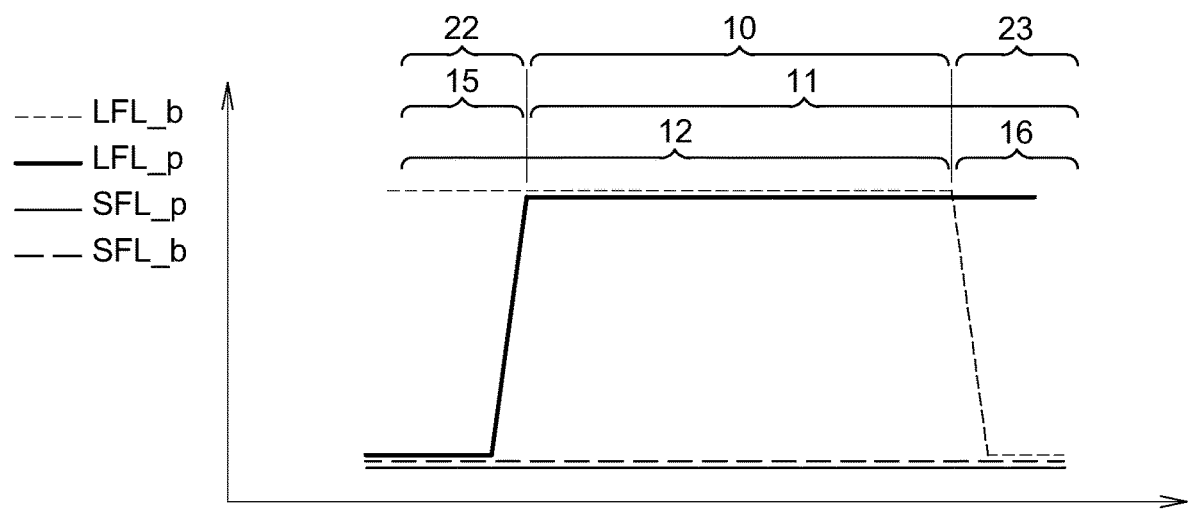
FIG. 5 is a graph of the type of FIG. 2 according to an alternative embodiment of a connection in accordance with the invention.

In order to reduce machining costs, the male member and female member are first blanked at the taper angle of the intended threaded zone, and that blanked taper angle will become the crest definition of the thread profile. So there is no further need to machine thread crests. Crests according to that embodiment shown FIG. 5 are parallel to the taper axis.

Figure 7:
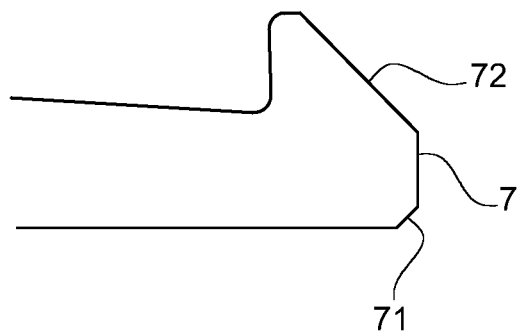
FIG. 7 is a detailed longitudinal cross-sectional view of one half of a distal end of a male member of a connection in accordance with the invention.
Figure 8:
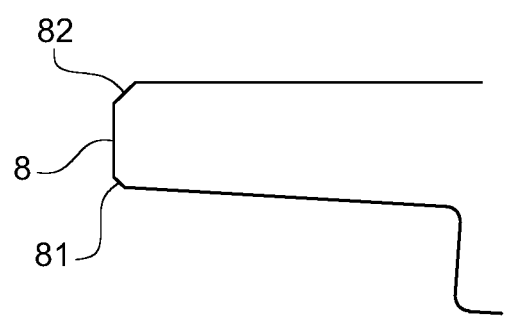
FIG. 8 is a detailed longitudinal cross-sectional view of one half of a distal end of a female member of a connection in accordance with the invention.

As shown on FIGS. 7 and 8, terminal surfaces are perpendicular to the longitudinal axis X, and chamfers 71, 72, 81 and 82 are machined from the terminal surface respectively toward inner and respective outer surfaces. For example, according to a preferred embodiment of the invention, all chamfers are 45° chamfers versus the plane of the terminal surfaces. Chamfers 71 and 81 are machined toward the inner surface of respectively the male member and the female member. Chamfers 72 and 82 are machined toward the outer surface of respectively the male member and the female member. Load flank, as well as stab flank of the thread profile, are successively machined. Run in location for the machining inserts for respectively machining the load flanks and the stab flanks starts within respectively chamfer 72 for the male thread and chamfer 81 for the female thread. Thread machining does not affect terminal surface height, thus providing make up tolerances at the step of introducing the pin into the box and avoiding to damage to the first stabbing surfaces. Preferably the machining starts at less than 0.15 mm from the terminal surface in the radial direction.

Root of the thread profile is obtained thanks to the successive use of a first final threading path to machine at least the load flank that is also able to machine part of the root profile adjacent to the load flank, and then the use of a second final threading path to machine the stab flank that is also able to machine part of the root profile adjacent to the stab flank. There is no need of a third insert to machine the root profile as the root profile evolves from a minimum width value WRpmin to a maximum root width value WRpmax for the pin member, and from a minimum width value WRbmin to a maximum root width value WRbmax for the pin member such that $$WRb\text{max} \leq 2*WRb\text{min}$$

And $$WRp\text{max} \leq 2*WRp\text{min}$$

Preferably $$WRb\text{max} \leq 4 \text{ mm}$$

And $$WRb\text{max} \leq 4 \text{ mm}$$

Preferably, $$WRb\text{max} \leq 2*WRb\text{min}-0.5 \text{ mm}$$

And $$WRp\text{max} \leq 2*WRp\text{min}-0.5 \text{ mm}$$

WRpmin may be about 2.2 mm in one example of the invention.

Alternatives where WRpmax and WRbmax are not in the same plane at the end of make up, as shown on FIG. 1, are also encompassed in the scope of the present invention.

Root width evolves respectively along the male and female threaded zones. The male thread of the male threaded zone 3 has a first portion 11 in which the width of the thread root WRp decreases in a direction oriented from the male terminal surface 7 towards the pipe body of the first tubular component 5, and a second portion 15 adjacent to the first portion 11 in which the width of the thread root remains at a minimum constant width value WRpmin, the tooth closest to the male terminal surface 7 presenting a maximum root width value WRpmax of the male thread.

The female thread of the female threaded zone 4 has a first portion 12 in which the width of the thread root WRb decreases along a direction oriented from the female terminal surface towards the pipe body of the second tubular component, and a second portion 16 adjacent to the first portion 12 in which the width of the thread root remains at a minimum constant width value WRbmin, the tooth closest to the female terminal surface 8 presenting a maximum root width value WRbmax of the female thread.

Within first portions 11 and 12, there is a progressive variation of the axial width of the thread crests, and correspondingly a progressive variation of the axial width of the thread roots, such that a progressive axial tightening is produced during make-up of such connection until a final locking position. Within second portions 15 and 16, width of the roots and width of the crests remain at a constant value.

When made up, the connection of the invention is comprising a locking portion 10 wherein some teeth of first portion 11 are in a known "self-locking" configuration with some teeth of first portion 12.

First portions 11 and respectively 12 of the male thread and female thread are partially made up in a self-locking arrangement means that not all of the teeth of the first portion are in a self-locking make-up arrangement, such that some teeth of the first portion 11 of the male thread are not in contact, either considering their load flanks and or their stab flanks, with the corresponding teeth of the female thread and some teeth of the first portion 12 of the female thread are not in contact, either considering their load flanks and or their stab flanks, with the corresponding teeth of the male thread. Teeth of the first portions 11 and 12 that are not in self-locking arrangement have at least one of their load flank or stab flank not in contact with any corresponding surface of the other thread.

In a made up configuration of the connection, the thread of the second portions 15 and 16 are not made up in a self-locking arrangement with the corresponding thread of the first portion they are made up. Second portions 15 and 16 are located on both opposite side of the locking region 10. Second portion 15 is closer to the pipe body of the first component 5 than the first portion 11, such that the second portion 15 is engaged with female tooth of the female threaded zone 4 close to the female terminal surface 8. The male second portion 15 is engaged with tooth of the female first portion 12 in order to form a first non locking region 22. Second portion 16 is closer to the pipe body of the second component 6 than the first portion 12, such that the second portion 16 is engaged with male tooth of the male threaded zone 3 close to the male terminal surface 7. The female second portion 16 is engaged with tooth of the male first portion 11 in order to form a second non locking region 23.

First non locking region 22 is adjacent to a longitudinal side 24 of the locking region 10, and the second locking region 23 is adjacent to the opposite longitudinal side 25 of that locking region 10.

Figure 2:
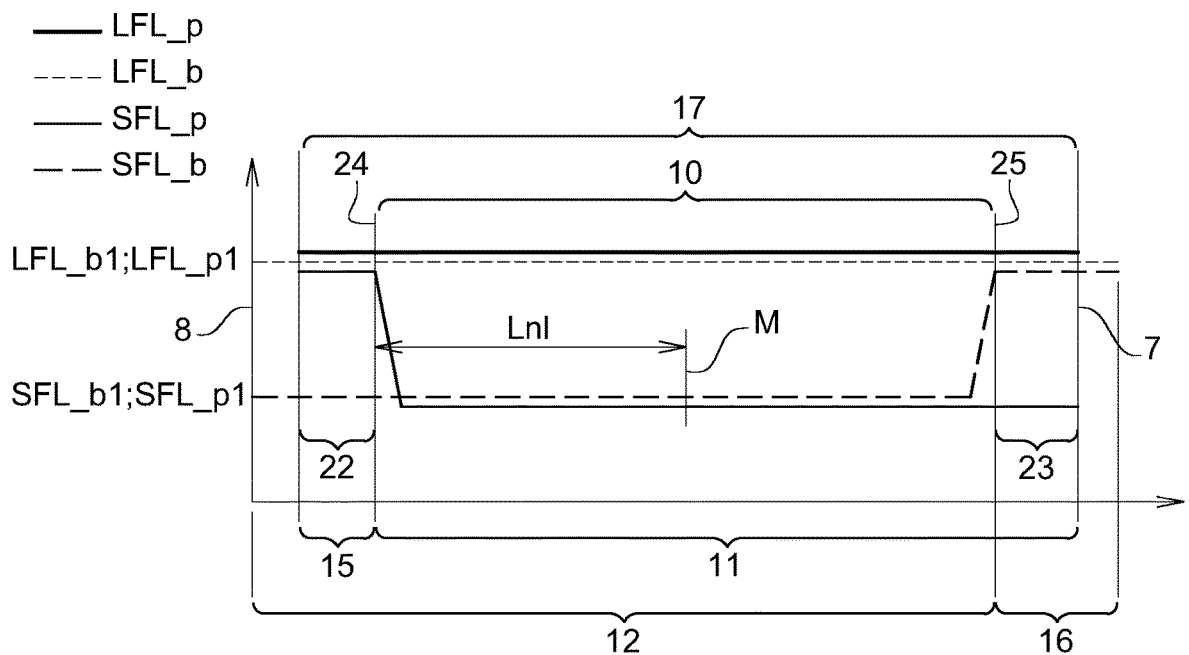
Figure 3:
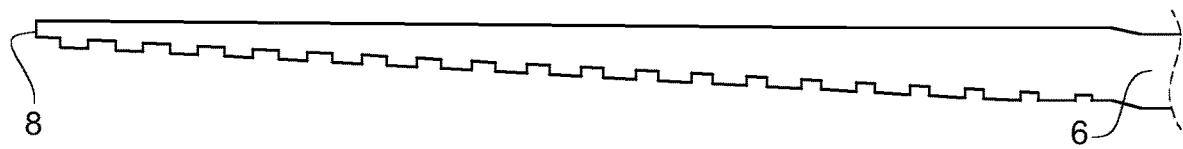
FIG. 3 is a longitudinal cross-sectional view of one half of a female member of a connection in accordance with the invention.
Figure 4:
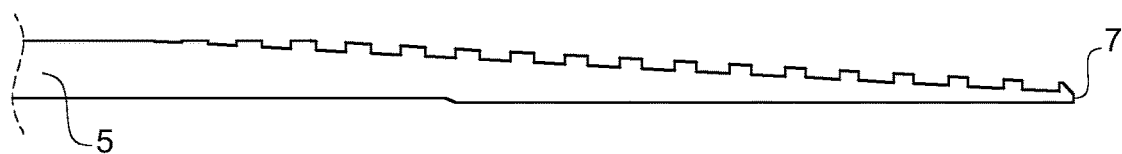
FIG. 4 is a longitudinal cross-sectional view of one half of a female member of a connection in accordance with the invention.

As shown of FIGS. 1 and 2, the female threaded length may be longer than the male threaded length, along the longitudinal axis X, especially in the event where the pipe body outer diameter of the first tubular component 5 is close to maximum accepted tolerance, and pipe body wall thickness of the second tubular component 6 is close to minimum accepted tolerance according to API 5CT. When both first and second tubular component 5, and 6 are presenting an outer diameter and wall thickness close to nominal requirement of API 5CT, then female threaded length is sensibly equal to male threaded length.

When made up, a total make up length 17 of engaged male and female threads is shorter than the longest axial length of the female or male threaded zone. According to the embodiment of FIGS. 1 and 2, the total make up length 17 corresponds to the axial length of the male threaded zone 3. The invention is suitable for pipes produced within the whole range of API 5CT accepted pipes according to outer diameter tolerances and pipe width tolerances.

The term "self-locking" configuration means the characteristics detailed below for the teeth in the locking region 10. The male threads (or teeth) 32, like the female threads (or teeth) 42, have a constant lead although their crest width respectively decreases towards their respective terminal surface 7, 8 such that during make-up, some of male 32 and female 42 threads (or teeth) finish by locking into each other in a determined position. Thread in the locking configuration 10, are such that all the stab flanks and all the load flanks of the male threads (or teeth) lock against one another respectively the stab flanks and the load flanks of the corresponding female threads (or teeth).

Figure 6:
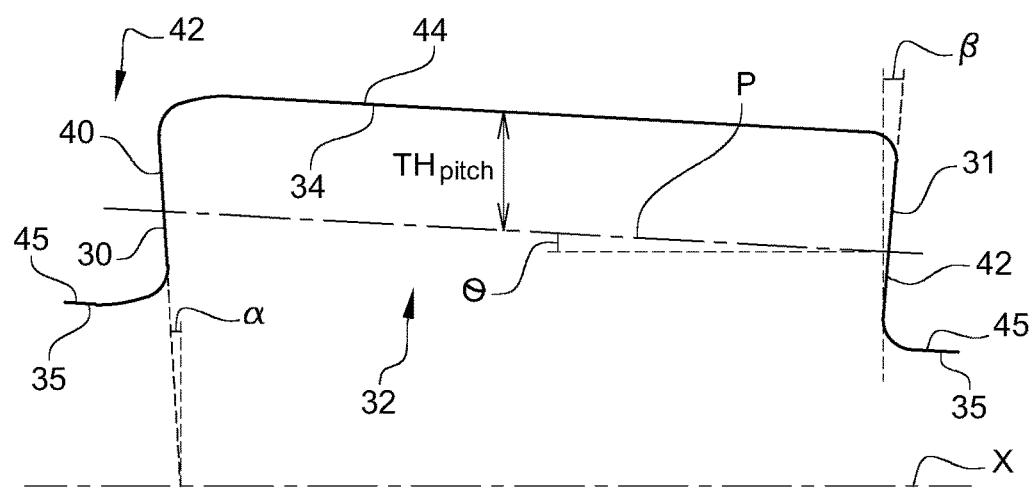
FIG. 6 is a detailed longitudinal cross-sectional view of a male tooth of the male end made up with a female tooth of the female according to an embodiment of a connection in accordance with the invention.

At the end of makeup, in the locking region 10, as shown FIG. 6, there is no axial gap between axial flanks, both Load flanks 30, 40 and Stab flanks 31, 41. Axial flanks define essentially radially compared to the axis of the connection. Moreover, design of the connection according to the invention is such that there is no radial gap between male thread crest 34 and female thread root 44, and also between male thread root 35 and female thread crest 45 in the locking region 10. Thus, the locking region forms a seal by generating enough contact to trap dope and withstand high pressure. Crests 34, 45 and roots 44, 35 are in interfering contact, and axial flanks interfere too. Crests and roots of the male and female thread in the locking region are parallel to the taper generatrix of the threaded zones.

Advantageously and as shown in FIG. 6, the male and female threads (or teeth) have a dovetail profile. This profile enables to avoid the risk of jump-out, which corresponds to the male and female threads coming apart when the connection is subjected to large bending or tensile stresses. More precisely, the geometry of the dovetail threads increases the radial rigidity of their assembly compared with threads, which are usually termed "trapezoidal" threads wherein the axial teeth width reduces from the base to the crest of the threads. Advantageously, the load flanks of the thread connect to the thread crest and to the adjacent thread root by roundings such that these roundings reduce the stress concentration factor at the foot of the load flanks and thereby improve the fatigue behavior of the connection.

Along a longitudinal section of the threaded connection, both load flank and stab flank present a straight profile. Load flank and stab flank are respectively making negative angle $\alpha$, respectively negative angle $\beta$ with a vertical to the longitudinal axis X. Load flank angle value $\alpha$ is inferior or equal to stab flank angle value $\beta$, while being opposed and defined on opposed sides of a vertical to the longitudinal axis X. For example, angles $\alpha$ and $\beta$ are comprised between 1° and 5°. Thus the width of a root, at the bottom of the interval between two adjacent teeth, is always the largest dimension of that teeth when considering the width of a teeth along the longitudinal axis X.

According to the present invention, only a specific number of threads of each of the male 32 and female 42 threads are in that specific locking configuration, and are involved in the locking portion 10. The locking portion 10 is away from the first and last thread of the threaded zone 3 and 4. At least first and last thread of both the male 32 and female 42 threads are not in a locking configuration. Locking region represents more than 60%, and even preferably more than 70% of the total make up length 17.

For an example, the locking region 10 comprises 10 to 16 threads turns where the female threaded zone in full comprises at least 16 threads turns, and the male threaded zone in full comprises at least 16 threads turns.

According to the first embodiment of FIG. 2, the male threaded zone 3 comprise a first portion 11 wherein the lead SFL_p between the male stabbing flanks 31 is constant at a value SFL_p1, and the lead LFL_p between the male load flanks 30 is also constant but at a different value LFL_p1. In the example of FIG. 6, LFL_p1 is strictly superior to SFL_p1. For a first example of the first embodiment of the invention:

LFP_p1=8.33 mm
SFP_p1=8.20 mm

For a second example of the first embodiment of the invention:

LFP_p1=10 mm
SFP_p1=9.87 mm

Thus a wedge ratio of the first portion, which is the difference between the load flank lead and the stab flank lead, for both examples are below 0.15 mm.

Within the scope of the invention, other stab flank lead and load flank lead values are acceptable.

Similarly, the lead LFL_b between the load flanks 41 of the female thread in the first portion 12 is constant at a value LFL_b1, and the lead SFL_b between the stabbing flanks 40 is also constant but at a different value SFL_b1, with the feature that the lead between the load flanks 41 is greater than the lead between the stabbing flanks 40.

Further, as represented FIG. 2, the respective leads SFL_p1 and SFL_b1 between the male 31 and female 40 stabbing flanks are equal and smaller than the respective leads LFP_p1 and LFP_b1 between the male 30 and female 41 load flanks, which are themselves equal.

More specifically, LFP_b1=LFP_p1 and SFP_b1=SFP_p1.

According to FIG. 2, in the non locking region 22, male stab flank lead SFL_p and male load flank lead LFL_p are equal to each other, and equal to the LFL_p1 as of the location of the longitudinal side 24 of the locking region 10, the male stab flank lead changes. Within the second non locking region 23, female stab flank lead SFL_b and female load flank lead LFL_b are equal to each other, and also equal to the LFL_b1 as of the location of the second longitudinal side 25 of the locking region 10, the female stab flank lead changes.

Locations 24 and 25 are defined by the location where stab flank leads change on respective threaded zones. Both male and female threaded zones have a unique change in stab flank lead value, whereas load Flank leads remain constant all along the threaded zones. Changes are sudden, and appear in less than one turn, preferably less than 180°.

Alternatively, according to a second embodiment of the invention, as represented FIG. 5, male and female threaded zones have constant stab flank leads but a unique change in the load flank lead value at two distinct location for respectively the male and female threaded zones.

FIG. 1, in the non locking regions 22 and 23, a positive clearance exists between respective male and female stab flanks. For example, that clearance is at least 1 mm, and for example below 5 mm.

Preferably, a middle M of the locking region 10 locates radially in the middle of the threaded connection. M is identified at axial half length of the locking region 10 such that a pitch line diameter TDavg at the middle locking location M is as follows $(OD+ID\text{max})\div 2-5\% \ WT<TD\text{avg}<(OD+ID\text{max})\div 2+10\% \ WT$ OD is a nominal pipe body outer diameter according to API 5CT requirement WT is a nominal pipe width according to API 5CT requirement IDmax is a maximum accepted pipe body inner diameter according to API 5CT requirement According to one example of the first embodiment of the invention, OD=5.5 in or 139.7 mm Wall thickness, WT=0.361 in or 9.1694 mm API maximum pipe OD tolerance ODmax is 101% of the nominal pipe body outer diameter and API minimum wall thickness tolerance WTmin is 87.5% of the remaining pipe body wall thickness.

$ID \text{ max}=OD\text{max}-2*WT\text{min}=139.7*1.01-2*9.1694*0.875=125.0506$

In order to have the middle M at the middle of the connection, an acceptable pitch line diameter TDavg at the middle locking location M is $$TDavg = average(OD, ID\max) = (139.7+125.0506)/2 = 132.375 \text{ mm}$$

Thanks to the invention, perfect locking threads are dedicated to the locking region 10, even considering worst case API pipe tolerances. Preferably, as the length of the Perfect threaded zone is governed by pipe parameters and outer diameter tolerances, the perfect threaded zone is selected to have perfect thread over a length longer than the required locking region.

Imperfect threads are such that the crests and/or the roots of the teeth of the male and female threaded zones are parallel to the longitudinal axis X of the threaded connection. This facilitates machining. Male imperfect threads are found in the second portion 15. Male imperfect threads are found in the second portion 16. Imperfect threads within second portions 15 and 16 improve tension efficiency of the connection.

Teeth with the minimum root width are imperfect close to the transition with the non-threaded portions toward the pipe body. Imperfect thread have a lower height than the regular height of the other threads in the locking region 10.

Middle locking location M is identified at axial half length of the locking region such that a length Lnl from that middle locking location to a longitudinal side either 24 or 25 of the locking region 10 is such that $$Lnl \leq (OD \div 2 - ID\max \div 2 - THpitch) \div (2*\tan(\theta))$$

THpitch is a vertical distance from pitch line P to the crest 34 in the locking region may be comprised between 0.5 to 1.0 mm According to the above example of the first embodiment of the invention, Lnl may be comprised between 50 to 60 mm. The minimum make-up torque required may be between 30 000 ft·lbs (40674 N·m) and 50 000 ft·lbs (67 790 N·m).

In order to ease make up, a surface treatment is provided to the female member only, and dope is additionally placed around the male member before make up. Alternatively, both the male member and the female member may be surface treated. For example, a surface treatment may be Zinc Phosphate treatment.

The invention claimed is:

1. A threaded connection comprising:
   a first and a second tubular component, the first tubular component being provided with a pipe body and a male member at a distal end of the pipe body, the second tubular component being provided with another pipe body and a female member at a distal end of that pipe body, such that the male member comprises, on an external peripheral surface of the male member, at least one male threaded zone and finishes in a male terminal surface, and the female member comprises, on an internal peripheral surface of the female member, at least one female threaded zone and finishes in a female terminal surface,
   the male threaded zone comprising a male thread having a first portion in which a width of the thread root decreases in a direction oriented from the male terminal surface towards the pipe body of the first tubular component, and a second portion adjacent to the first portion in which the width of the thread root remains at a minimum constant width value, a tooth closest to the male terminal surface presenting a maximum root width value of the male thread, and
   the female threaded zone comprising a female thread having a first portion in which a width of the thread root decreases along a direction oriented from the female terminal surface towards the pipe body of the second tubular component, and a second portion adjacent to the first portion in which the width of the thread root remains at a minimum constant width value, a tooth closest to the female terminal surface presenting a maximum root width value of the female thread,
   wherein the first portions of the male thread and female thread are partially made up in a self-locking arrangement in order to provide a locking region in the threaded connection, and
   wherein a middle locking location is identified at axial half length of the locking region such that a pitch line diameter at the middle locking location TDavg is as follows:

$$(OD+ID\max) \div 2 - 5\% \ WT < TDavg < (OD+ID\max) \div 2 + 10\% \ WT,$$

OD is a nominal pipe body outer diameter according to API 5CT requirement,
   WT is a nominal pipe width according to API 5CT requirement, and
   IDmax is a maximum accepted pipe body inner diameter according to API 5CT requirement.

2. A threaded connection according to claim 1, wherein the locking region represents more than 60% of the total make up length of engaged male and female threads.

3. A threaded connection according to claim 1, wherein the locking region is located between two non-locking regions, each non locking region being respectively adjacent to each longitudinal sides of the locking region.

4. A threaded connection according to claim 1, wherein the male threaded zone comprise a single male thread made of a single continuous spiral such that the lead of the male stab flanks changes at a single location on the male thread, and the female threaded zone comprise a single female thread made of a single continuous spiral such that the lead of the female stab flanks changes at a single location on the female thread, respective male and female change in stab flanks leads being at different location such that the locking region is defined between those two locations, and wherein the lead of male load flanks and the lead of the female load flanks remain constant along the whole male threaded zone, and respectively female threaded zone.

5. A threaded connection according to claim 1, wherein the male threaded zone comprise a single male thread made of a single continuous spiral such that the lead of the male load flanks changes at a single location on the male thread, and the female threaded zone comprise a single female thread made of a single continuous spiral such that the lead of the female load flanks changes at a single location on the female thread, respective male and female change in load flanks leads being at different location such that the locking region is defined between those two locations, and wherein the lead of male stab flanks and the lead of the female stab flanks remain constant along the whole male threaded zone, and respectively female threaded zone.

6. A threaded connection according to claim 1, wherein a wedge ratio in the locking region is below 0.15 mm.

7. A threaded connection according to claim 1, wherein the male and female threaded zones have a taper generatrix forming an angle θ is the taper angle, wherein the taper angle is an angle between the taper generatrix and a longitudinal axis of threaded connection, the taper being in the range of 3.6° to 4.8°, and wherein crests and roots of the male and female thread in the locking region are parallel to the taper generatrix of the threaded zones.

8. A threaded connection according to claim 1, wherein a middle locking location is identified at axial half length of the locking region such that a length, Lnl, from that middle locking location to a longitudinal side of the locking region as follows:

$$Lnl \leq (OD \div 2 - IDmax \div 2 - THpitch) \div (2*\tan(\theta)),$$

OD is a nominal pipe body outer diameter according to API 5CT requirement,

IDmax is a maximum accepted pipe body inner diameter according to API 5CT requirement, THpitch is a vertical distance from pitch line to root or crest in the locking region, and θ is the taper angle of the threaded zone.

9. A threaded connection according to claim 1, wherein maximum root width value of the male and/or female thread is set below twice the minimum root width value of the corresponding male or female thread.

10. A threaded connection according to claim 1, wherein the root of the female thread which is closest to the pipe body of the second tubular component has the same root width as the root of the male thread which is closest to the pipe body of the first tubular component.

11. A threaded connection according to claim 1, wherein respective teeth of the male thread and female thread respectively close to the pipe body have at least one different thread height.

12. A threaded connection according to claim 1, wherein the female thread starts as of the female terminal surface and the male thread starts as of the male terminal surface.

13. A threaded connection according to claim 1, wherein the teeth of the male and female threaded zones have a dovetail profile, and, α and β are the load flank angle and stab flank angle respectively with a perpendicular to an axis of the threaded connection, both α and β being less than 5°.

14. A threaded connection according to claim 1, wherein both the crests of the teeth of the male thread and the crests of the teeth of the female thread are interfering with corresponding roots in the locking region, such that the diameter interference at the root/crest interference may be between 0.0020 and 0.0030 times the pipe body nominal outer diameter.

15. A threaded connection according to claim 1, wherein the threaded connection is free from any distal abutment surface, a free end of the male member being away from the female member, and respectively a free end of the female member being away from the male member.

16. A threaded connection according claim 1, wherein both male and female member are free of any additional sealing surfaces beside the locking region.

17. A threaded connection according to claim 1, wherein the threaded connection includes contact surfaces and non-contact surfaces, and the first and the second tubular components are integral with their respective pipe bodies.

18. A threaded connection according to claim 1, wherein the male threaded zone and the female threaded zone are single start thread.

* * * * *